United States Patent
Fukushima et al.

(10) Patent No.: US 7,576,773 B2
(45) Date of Patent: Aug. 18, 2009

(54) DIRECT RECORDING DEVICE AND DIRECT RECORDING METHOD

(75) Inventors: Keito Fukushima, Tokyo (JP); Toshihiro Ogata, Hachioji (JP)

(73) Assignee: Olympus Corporation, Tokyo (JP)

( * ) Notice: Subject to any disclaimer, the term of this patent is extended or adjusted under 35 U.S.C. 154(b) by 786 days.

(21) Appl. No.: 11/093,825

(22) Filed: Mar. 29, 2005

(65) Prior Publication Data
US 2005/0168580 A1 Aug. 4, 2005

Related U.S. Application Data

(63) Continuation of application No. PCT/JP2004/005639, filed on Apr. 20, 2004.

(30) Foreign Application Priority Data
Apr. 25, 2003 (JP) ............... 2003-122838

(51) Int. Cl.
H04N 5/225 (2006.01)
H04N 5/76 (2006.01)
H04N 5/232 (2006.01)

(52) U.S. Cl. ............... 348/207.1; 348/231.2; 348/211.1

(58) Field of Classification Search ... 348/231.2–231.9, 348/207.99, 207.1, 207.2, 207.11, 207.12, 348/211.1, 211.2
See application file for complete search history.

(56) References Cited

U.S. PATENT DOCUMENTS 7,095,436 B2 * 8/2006 Kato ............... 348/231.2

2002/0036698 A1 * 3/2002 Mizutani ............... 348/232
2002/0044157 A1 4/2002 Wolf et al.
2003/0021591 A1 * 1/2003 Grosvenor et al. ......... 386/124
2004/0201688 A1 10/2004 Wolf et al.
2005/0030584 A1 * 2/2005 Tanaka ............... 358/1.16

FOREIGN PATENT DOCUMENTS

JP 2000-125234 A 4/2000
JP 2001-188697 A 7/2001

(Continued)

OTHER PUBLICATIONS

Shoichi Shimizu; "Spotlight Tamatta Gazo mo Korede Sukkiri! Dejikame Gazo Kanri Soft", DOS/V Power Report; Sep. 1, 1999, vol. 9, No. 9, p. 219.

(Continued)

Primary Examiner—Nhan T Tran
Assistant Examiner—Trung Diep
(74) Attorney, Agent, or Firm—Frishauf, Holtz, Goodman & Chick, P.C.

(57) ABSTRACT

A direct recording device which is incorporated into each of a first apparatus and a second apparatus connecting by signal to the first apparatus, and allows mutual handling of data held by the first and second apparatuses, wherein the direct recording device incorporated into each of the first and second apparatuses includes an identifier setting part configured to set, for data stored in each of internal storage devices of the first and second apparatuses, an identifier for identifying the data, and a transfer part configured to mutually transmit and receive information containing at least one of an identifier and data stored in each of the internal storage devices of the first and second apparatuses.

24 Claims, 13 Drawing Sheets

FOREIGN PATENT DOCUMENTS

| | | |
|---|---|---|
| JP | 2001-230999 A | 8/2001 |
| JP | 2002-55388 A | 2/2002 |
| JP | 2002-334022 A | 11/2002 |
| JP | 2002-342045 A | 11/2002 |
| JP | 2003-69931 A | 3/2003 |
| JP | 2003-69935 A | 3/2003 |
| JP | 2003-76590 A | 3/2003 |
| WO | WO 99/56463 A | 11/1999 |
| WO | WO 01/28227 A | 4/2001 |

OTHER PUBLICATIONS

International Preliminary Report on Patentability for PCT/JP2004/005639.

Japanese Office Action dated Jan. 13, 2009 (2 pages), and English translation thereof (2 pages), issued in a counterpart Japanese Application No. 2003-122838.

* cited by examiner

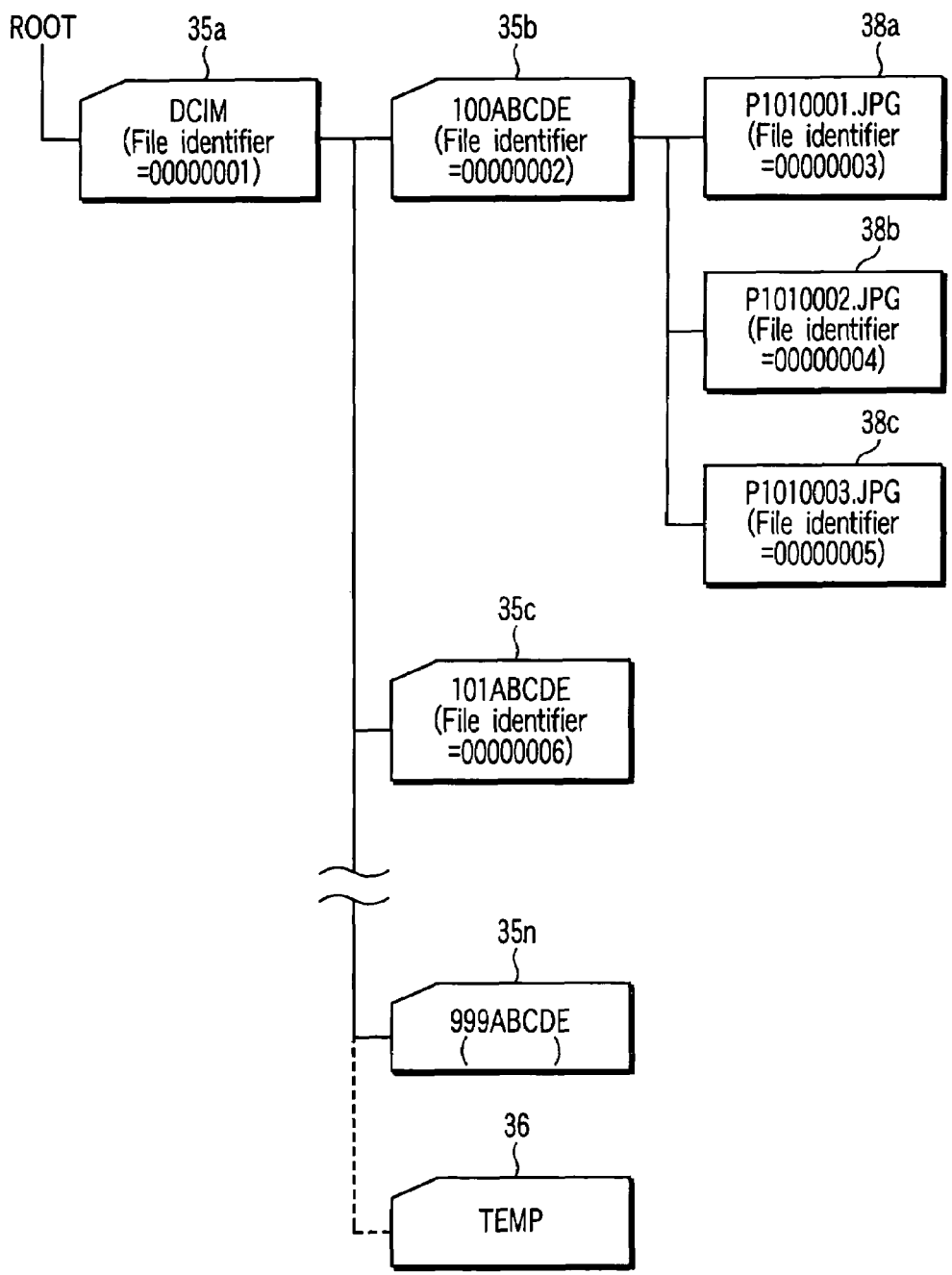
F I G. 7

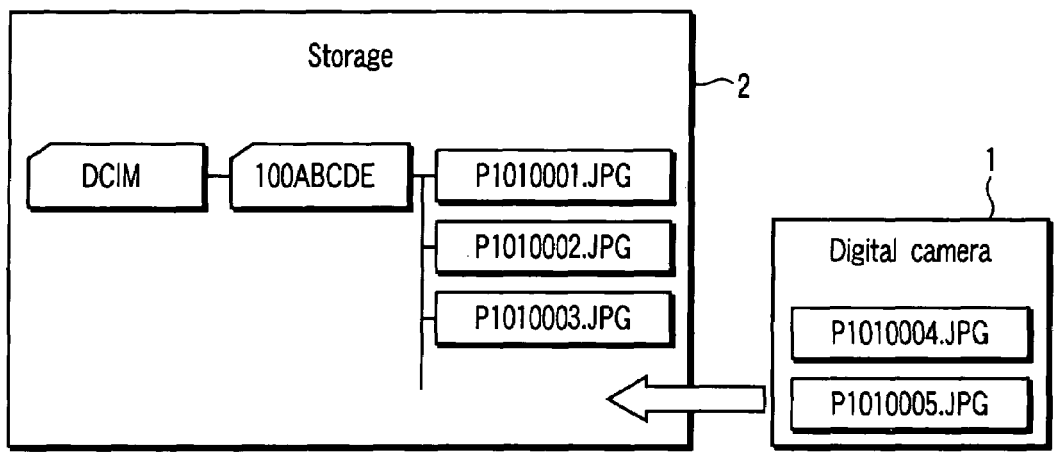
F I G. 10
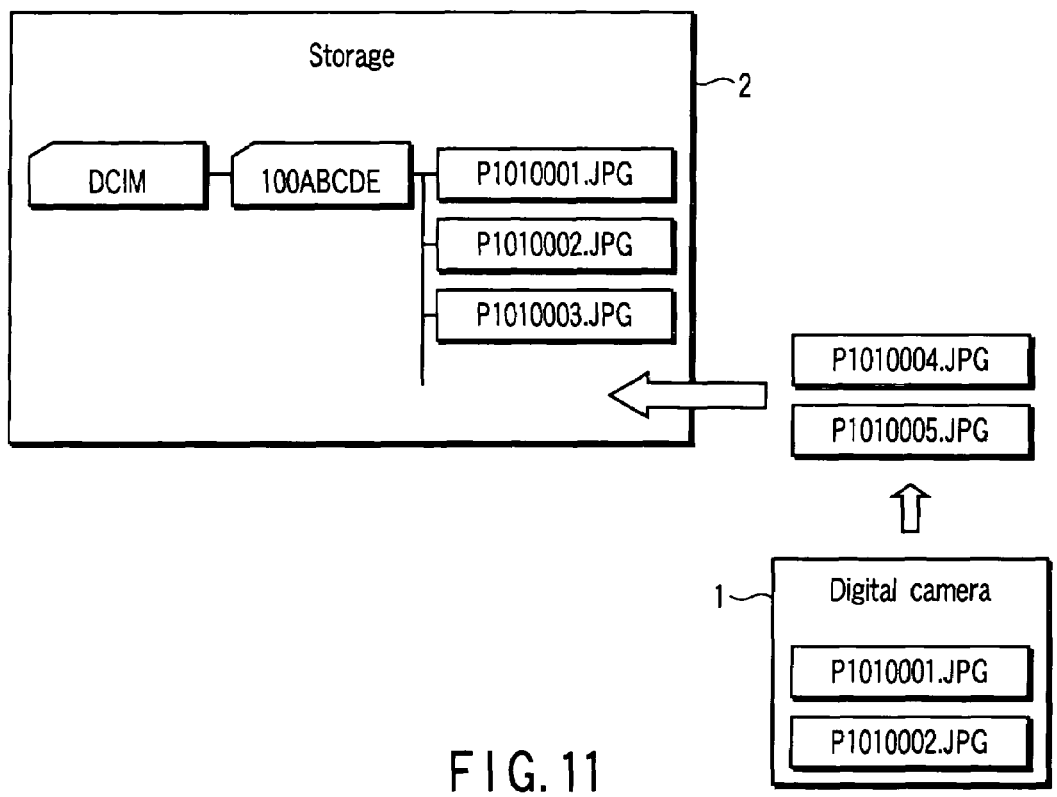
F I G. 11

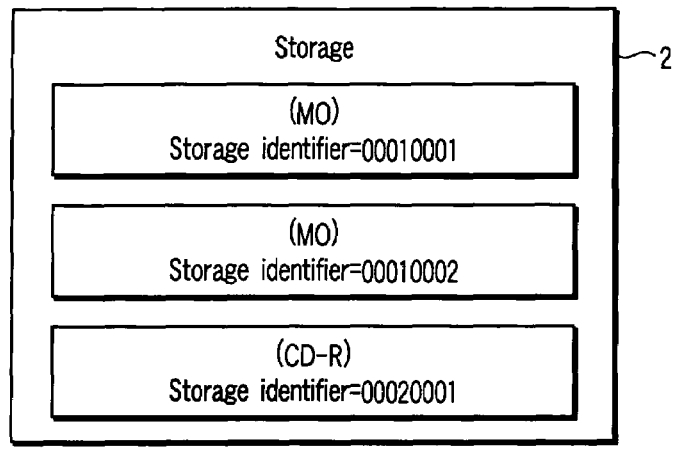
F I G. 13
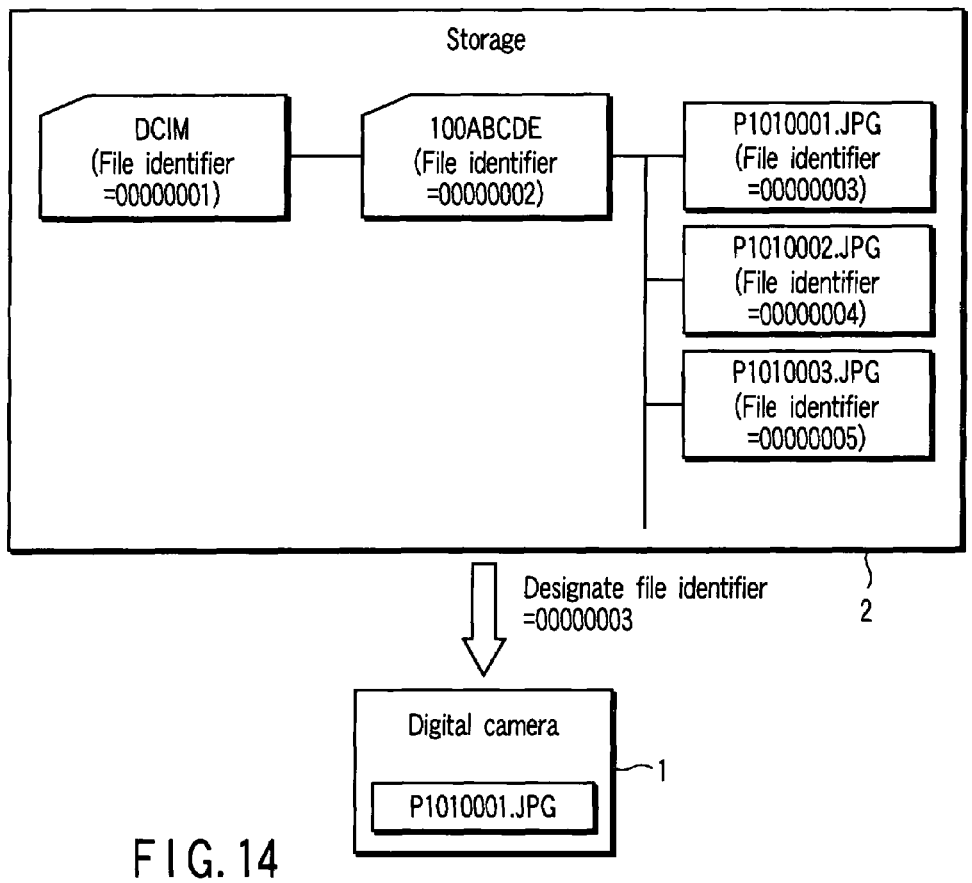
F I G. 14

DIRECT RECORDING DEVICE AND DIRECT RECORDING METHOD

CROSS-REFERENCE TO RELATED APPLICATIONS

This is a Continuation Application of PCT application No. PCT/JP2004/005639, filed Apr. 20, 2004, which was published under PCT Article 21(2) in Japanese.

This application is based upon and claims the benefit of priority from prior Japanese Patent Application No. 2003-122838, filed Apr. 25, 2003, the entire contents of which are incorporated herein by reference.

BACKGROUND OF THE INVENTION

1. Field of the Invention

The present invention relates to a technique by which apparatuses communicate with each other and process data stored in these apparatuses.

2. Description of the Related Art

Conventionally, when data such as images photographed by a digital camera is to be recorded in an external large-capacity recording device, this data such as images is transferred via a PC (Personal Computer). However, from the viewpoint of the convenience of handling, a technique is used by which a digital camera and magnetooptical disk drive corresponding to the USB storage class are directly connected, and data is transferred to the magnetooptical disk drive by using a single button.

Also, Jpn. Pat. Appln. KOKAI Publication No. 2002-055388 discloses a technique by which a detachable recording medium is attached to a camera itself, and sensed image data is recorded on this recording medium.

A camera system described in this disclosed technique is made up of a camera and a data recorder attached to the lens mount of the camera. The camera reads out sensed image data recorded on a first recording medium, and records the readout data in a second recording medium which is detachable via a signal terminal. This technique disclosed in Jpn. Pat. Appln. KOKAI Publication No. 2002-055388 can directly transfer data without using any PC.

BRIEF SUMMARY OF THE INVENTION

A direct recording device according to a first aspect of the present invention is incorporated into each of a first apparatus and a second apparatus connecting by signal to the first apparatus, and allows mutual handling of data held by the first and second apparatuses, wherein the direct recording device incorporated into each of the first and second apparatuses includes: an identifier setting part configured to set, for data stored in each of internal storage devices of the first and second apparatuses, an identifier for identifying the data; and a transfer part configured to mutually transmit and receive information containing at least one of an identifier and data stored in each of the internal storage devices of the first and second apparatuses.

A direct recording method according to a first aspect of the present invention is a method of a direct recording device which is incorporated into each of a first apparatus and a second apparatus connecting by signal to the first apparatus, and allows mutual handling of data held by the first and second apparatuses, wherein the direct recording method of the direct recording device incorporated into each of the first and second apparatuses includes: setting, for data stored in each of internal storage devices of the first and second apparatuses, an identifier for identifying the data; and mutually transmitting and receiving information containing at least one of an identifier and data stored in the internal storage devices of the first and second apparatuses.

BRIEF DESCRIPTION OF THE SEVERAL VIEWS OF THE DRAWING

FIG. 7 is a view showing a method of numbering file identifiers;

FIG. 10 is a view for explaining a storage operation when the storage has no automatic file name generating function;

FIG. 11 is a view for explaining a storage operation when the storage has an automatic file name generating function;

FIG. 13 is a view showing the way storage identifiers are attached;

FIG. 14 is a view for explaining a file extracting operation;

DETAILED DESCRIPTION OF THE INVENTION

Figure 1:
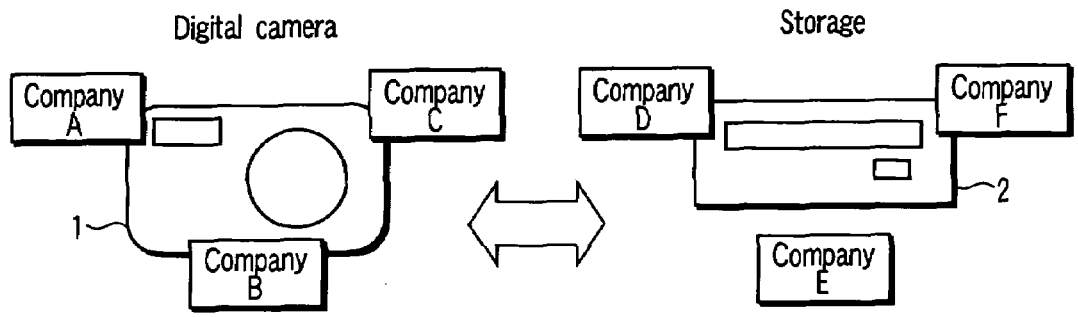
FIG. 1 is a view showing the aim of a direct recording device according to the present invention.

FIG. 1 is a view showing the aim of a direct recording device according to the present invention.

The direct recording devices according to the present invention are incorporated into a digital camera 1 as an apparatus and a storage 2 as a recorder. By the functions of the direct recording devices, the digital camera 1 and storage 2 can exchange data with each other independently of the manufacturers and apparatus types. Accordingly, a direct recording function according to the present invention can be implemented by incorporating identical direct recording devices in individual apparatuses as objects.

Figure 2:
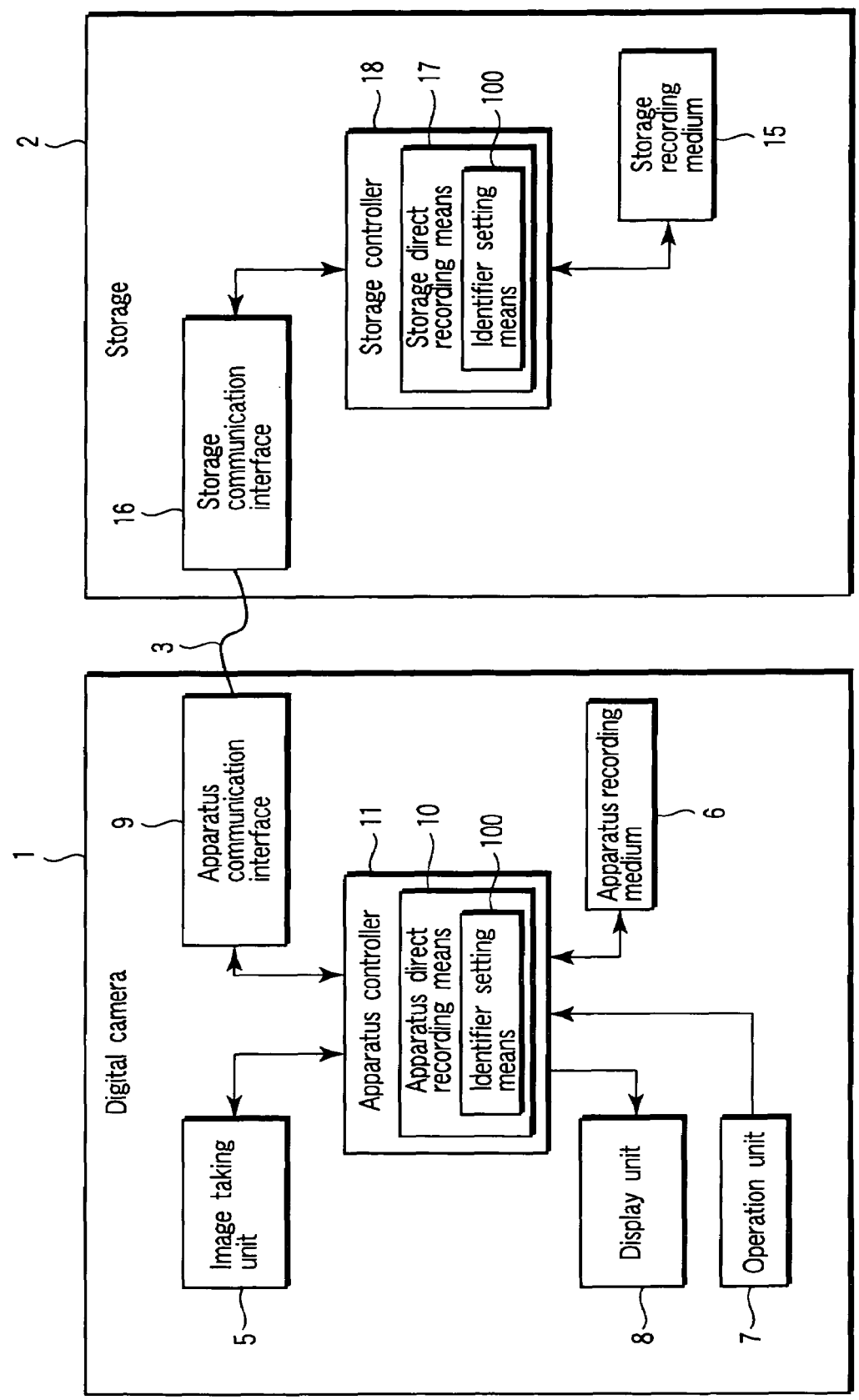
FIG. 2 is a view showing a direct recording system configured by apparatuses incorporating the direct recording devices according to the present invention.

FIG. 2 is a view showing a direct recording system configured by the apparatuses incorporating the direct recording devices according to the present invention.

The direct recording system is made up of the digital camera 1, the storage 2, and a communication line 3.

The digital camera 1 includes an image taking unit 5, an apparatus recording medium 6, an operation unit 7, a display unit 8, an apparatus communication interface 9, an apparatus direct recording means 10 as the direct recording device, and an apparatus controller 11.

The image taking unit 5 generates an image sensing signal by sensing an image of an object, and forms image data by performing various types of image processing. The apparatus recording medium 6 stores image data formed by the image taking unit 5 and the like. The operation unit 7 includes operation switches for inputting instructions concerning operations of the digital camera 1 and the like. The display unit 8 displays, e.g., image data or a user interface window. The apparatus communication interface 9 exchanges signals with the storage 2.

The apparatus direct recording means 10 performs transfer and handling of image data and the like with the storage 2. Although the apparatus direct recording means 10 is the direct recording device according to the present invention, it is so named as to indicate that it is incorporated into the digital camera 1. Also, the apparatus direct recording means 10 has an identifier setting means 100 for setting identifiers to be described later. The apparatus controller 11 comprehensively controls operations of the individual units of the digital camera, including operations of the apparatus direct recording means 10.

The storage 2 includes a storage recording medium 15, a storage communication interface 16, a storage direct recording means 17 as the direct recording device, and a storage controller 18.

The storage recording medium 15 stores image data and the like. The storage communication interface 16 exchanges signals with the digital camera 1. The storage direct recording means 17 performs transfer and handling of image data and the like with the digital camera 1. Although the storage direct recording means 17 is the direct recording device according to the present invention, it is so named as to indicate that it is incorporated into the storage 2. Also, the storage direct recording means 17 has an identifier setting means 100 for setting identifiers to be described later. The storage controller 18 comprehensively controls operations of the individual units of the storage, including operations of the storage direct recording means 17.

The communication line 3 is a path extensively used to transmit and receive information, and is not limited to communication using wires such as conductive lines and optical fibers but includes radio communication using light, sonic waves, and electronic waves.

In this direct recording system, the apparatus direct recording means 10 of the digital camera 1 and the storage direct recording means 17 of the storage 2 exchange signals with each other to perform a collaborated operation, thereby transferring and handling image data and the like.

These transfer and handling are executed via the protocol architecture of the direct recording device.

Figure 3:
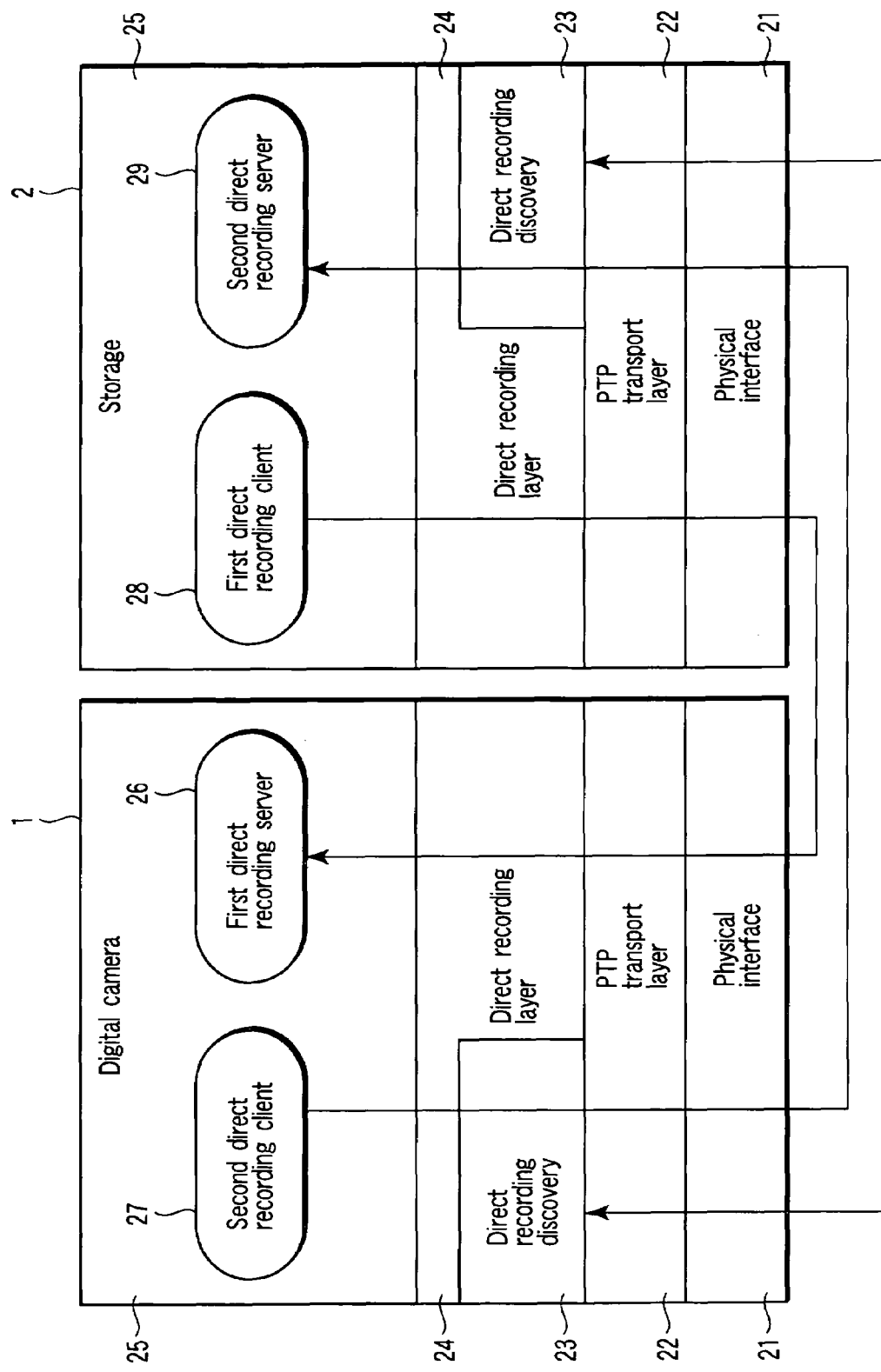
FIG. 3 is a view showing the protocol architecture of the direct recording device.

FIG. 3 is a view showing the protocol architecture of the direct recording device.

Referring to FIG. 3, the functions of layers described inside the digital camera 1 correspond to the configuration of the apparatus direct recording means 10, and the functions of layers described inside the storage 2 correspond to the configuration of the storage direct recording means 17.

As a physical communication layer, a physical interface 21 such as USB is formed. As a transport layer, a PTP transport layer 22 is formed. A PTP (Picture Transfer Protocol) is a protocol mainly used in image transfer of digital cameras. Note that these layers are not limited to the USB and PTP described above, but can be formed by appropriately using the known techniques.

Above the PTP transport layer 22, a direct recording layer 24 for realizing direct recording and a direct recording discovery 23 as a software component are formed. In an application layer 25 as the uppermost layer, a first direct recording server 26 and second direct recording client 27 as software components are formed on the digital camera side, and a first direct recording client 28 and second direct recording server 29 are formed on the storage side.

Before the digital camera 1 and storage 2 perform direct recording, the direct recording discovery 23 performs negotiation to check whether predetermined functions are supported.

The first direct recording (server/client) supports a function of transferring image data from the digital camera 1 to the storage 2. The first direct recording server 26 of the digital camera 1 provides data to a request from the first direct recording client 28 of the storage 2.

The second direct recording (server/client) supports a function of transferring image data from the storage 2 to the digital camera 1, and a function of manipulating image data in the storage. The second direct recording server 29 of the storage 2 provides data according to a request from the second direct recording client 27 of the digital camera 1.

The direct recording device according to the present invention achieves the following functions when the functions of the individual layers and the individual components shown in FIG. 3 operate as means in cooperation with each other.

Function 1: A function of making preparations for performing operations such as data transfer between the digital camera 1 and storage 2.

Operations defined in this preparation function are a discovery operation of performing negotiation to check whether the digital camera 1 and storage 2 support predetermined functions of performing direct recording, and a configure operation of exchanging detailed information pertaining to the individual functions.

Function 2: A function of transferring image data from the digital camera 1 to the storage 2 and storing the data in the storage recording medium 15.

A direct copy operation is defined as this function.

Function 3: A function of transferring image data from the storage 2 to the digital camera 1 and displaying the data on the display unit 8 or storing the data in the apparatus recording medium 6.

A direct display operation is defined as this function.

Function 4: A function of manipulating files and the like in the storage 2 from the digital camera 1.

Operations defined as this function are, e.g., the operation of copy/move of image data in the storage, the operation of copy/move of image data to another storage, an operation such as delete of image data in the storage, and a storage manipulating operation such as format.

The operation of the direct recording device will be explained below in accordance with these functions.

[Preparing Function]

First, the discovery operation of performing negotiation to check whether the digital camera 1 and storage 2 support predetermined functions of performing direct recording will be explained below.

Figure 4:
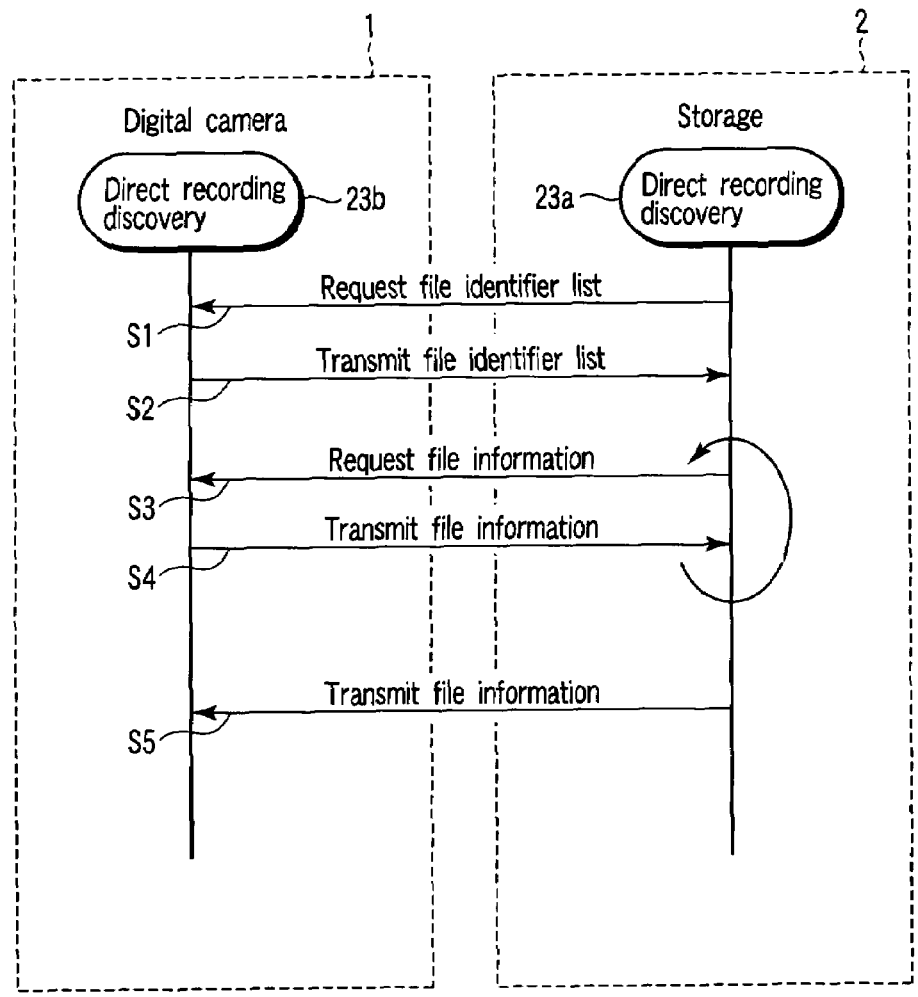
FIG. 4 is a view showing the signal exchange flow of a discovery operation.

FIG. 4 is a view showing the signal exchange flow of the discovery operation.

In step S1, when the digital camera 1 and storage 2 are connected by the communication line 3 and communication becomes possible, a direct recording discovery 23a on the storage side is activated to request the digital camera 1 to transmit a list of the file identifiers of files defining the direct recording function.

The file identifier is ID data for identifying an image data file or the like, and unique values are set for all files in the digital camera 1. Therefore, a file of interest can be specified by this file identifier. Note that details of the file identifier will be explained later.

In step S2, in the digital camera 1, a direct recording discovery 23b is activated to extract files defining the direct recording function supported by he digital camera, form a list of the file identifiers of these files, and transmit the list to the storage 2.

In steps S3 and S4, the storage 2 requests transmission of information of a file of each file identifier, and the digital camera 1 transmits, to the storage 2, the information of the file of the requested file identifier. This operation is repetitively executed for each file identifier described on the list.

This operation allows the storage 2 to recognize the direct recording function supported by the connected digital camera 1.

In step S5, the storage 2 extracts files defining the direct recording function supported by the storage, and transmits the file information (S5).

This operation allows the digital camera 1 and storage 2 to recognize each other's direct recording function. If it is confirmed that the digital camera 1 and storage 2 can execute direct recording, the digital camera 1 subsequently executes an operation of acquiring detailed direct recording function information and capability information of the storage 2.

Figure 5:
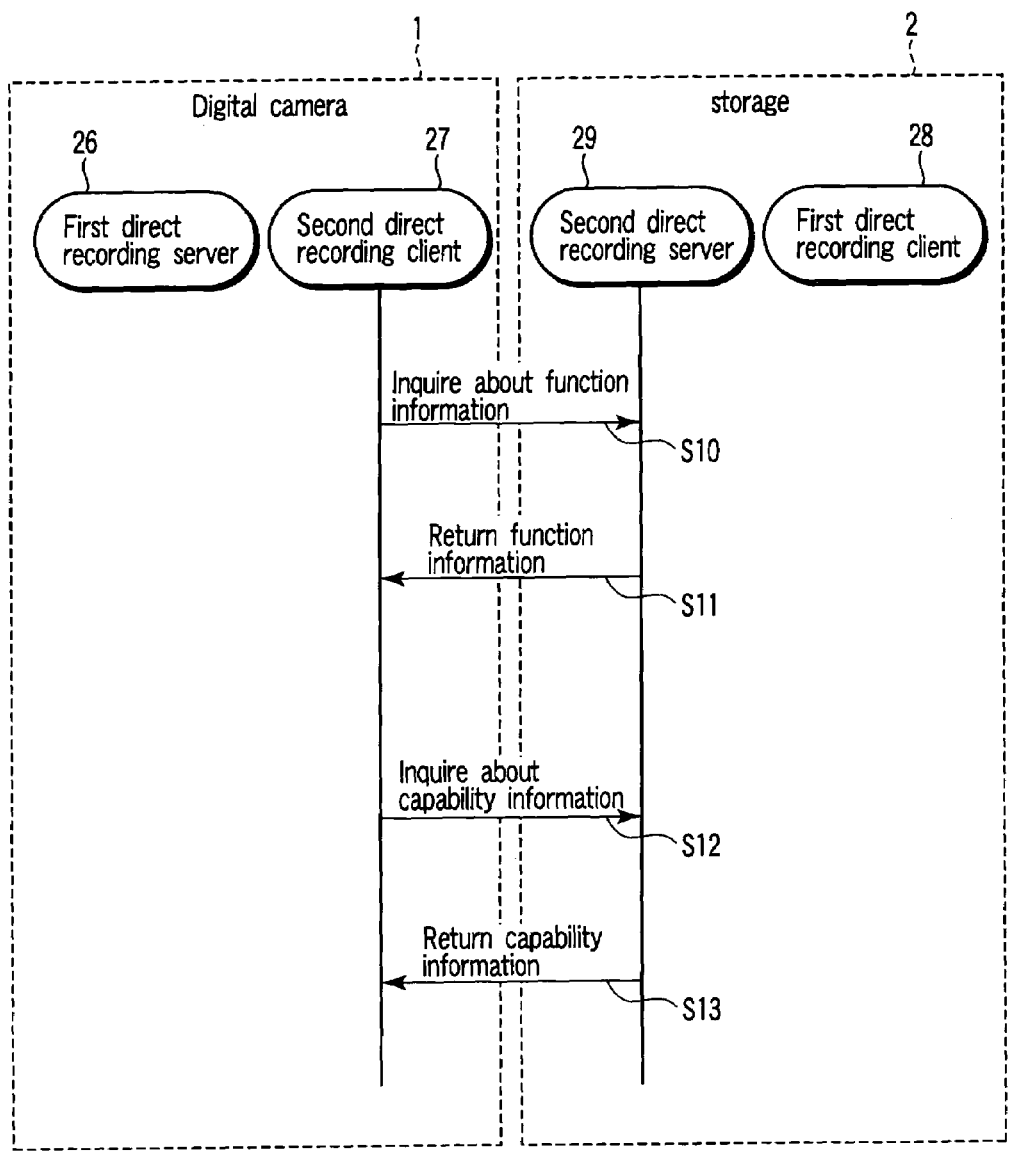
FIG. 5 is a view showing the signal exchange flow of an operation of acquiring function information and capability information.

FIG. 5 is a view showing the signal exchange flow of the function information and capability information acquiring operation.

Note that this acquiring operation is executed by signal exchange between the second direct recording server 29 and second direct recording client 27. Accordingly, the first direct recording server 26 and first direct recording client 28 do no exchange any signal.

In step S10, the second direct recording client 27 of the digital camera 1 inquires of the storage 2 the detailed function information. The inquired functions are, e.g., a function of data transfer from the digital camera 1 to the storage 2, a function of data transfer from the storage 2 to the digital camera 1, and a function of manipulating the files and the like in the storage 2. In addition to this inquiry, the direct recording client 27 also transmits apparatus information such as the apparatus name of the digital camera 1.

In step S11, the second direct recording server 29 of the storage 2 transmits a reply to the inquiry about each individual function.

Subsequently, in step S12, the second direct recording client 27 of the digital camera 1 inquires of the storage 2 the capability information. This capability information allows the digital camera 1 to designate an operation of the storage 2. Examples are the possibility of automatic formation of a file in the storage, the possibility of rename of a file name, and the possibility of protection of files.

In step S13, the second direct recording server 29 of the storage 2 transmits a reply to the inquiry about each individual capability.

After the above preparations, operations based on the individual functions can be executed.

[Direct Copy Function]

This function transmits image data from the digital camera 1 to the storage 2, and stores the data in the storage recording medium 15.

Figure 6:
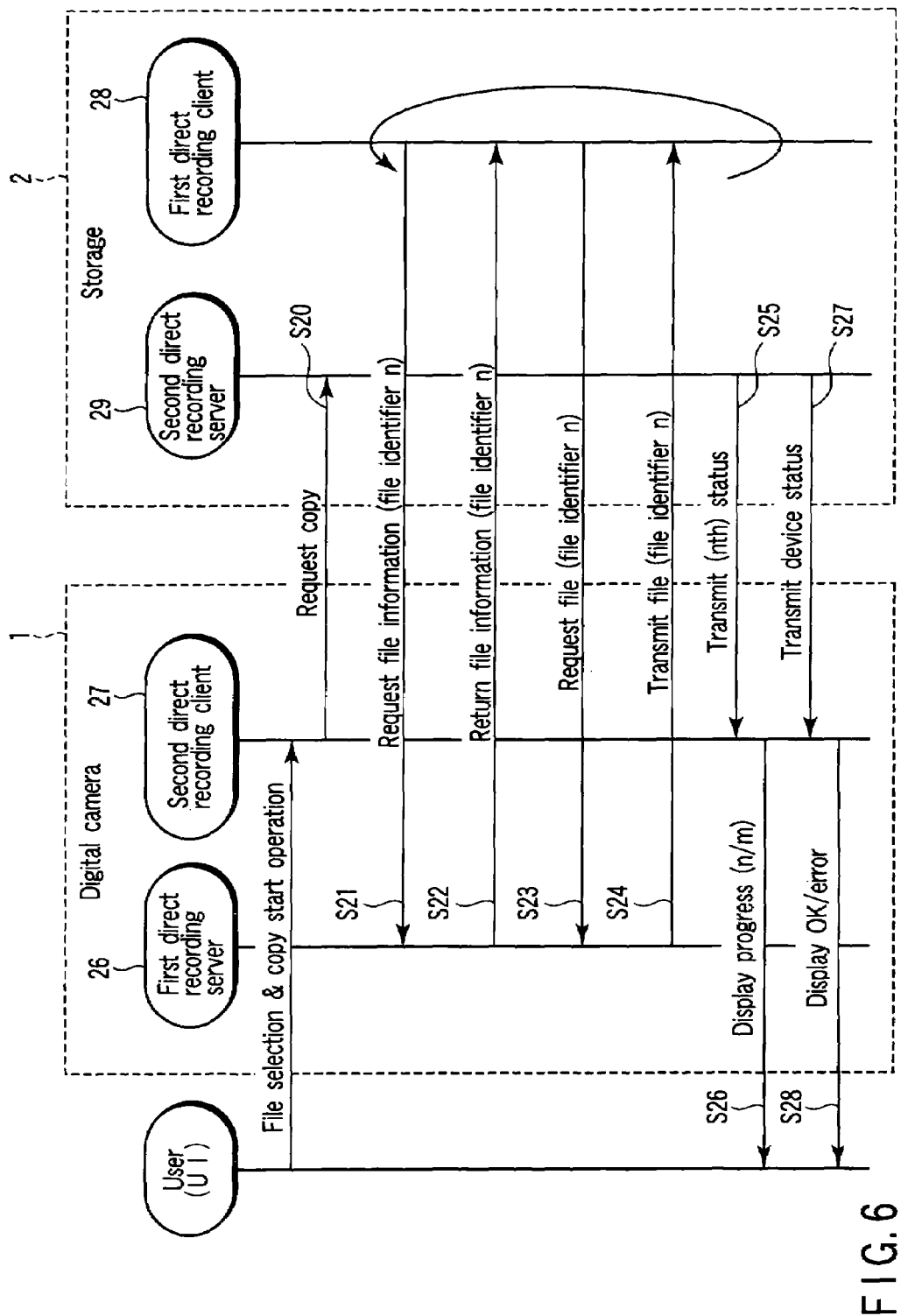
FIG. 6 is a view showing the signal exchange flow of a direct copy operation.

FIG. 6 is a view showing the signal exchange flow of the direct copy operation.

When the user selects a file of an image to be transmitted and inputs the start of direct copy by using the operation unit 7 and display unit 8 of the digital camera 1, in step S20, the second direct recording client 27 is activated to transmit a direct copy request by attaching, as data, a list of file identifiers (1 to m) to be transmitted.

In step S21, in the storage 2, the first direct recording client 28 extracts one file identifier (n) from the transmitted list, and requests the digital camera 1 to transmit file information of this file identifier (n).

In step S22, in the digital camera 1, the first direct recording server 26 edits the file information of the file identifier (n), and transmits the edited file information to the storage 2. This file information to be transmitted contains, e.g., the file name, file size, file attribute, file formation date, and file update date.

In the storage 2, the first direct recording client 28 makes preparations for receiving an image file on the basis of the transmitted file information. The first direct recording client 28 also checks the empty capacity from the file size to determine whether the image file can be received. If the image file can be received, in step S23, the first direct recording client 28 requests the digital camera 1 to transfer the file.

In step S24, in the digital camera 1, the first digital recording server 26 transmits the file of the file identifier (n) to the storage 2.

In the storage 2, the first direct recording client 28 stores the transmitted file in a predetermined area of the storage recording medium 15. Subsequently, in step S25, the second direct recording server 29 transmits a status indicating whether the copy operation of the file of the file identifier (n) is normally performed.

In step S26, in the digital camera 1, the second direct recording client 27 displays, on the display unit 8, a window indicating the progress of the copy operation on the basis of the status. The progress can be displayed in various forms. For example, the ratio (n/m) of copying can be graphically updated and displayed by a bar graph, circular graph, or the like, or the situation of the progress can be indicated by deleting or displaying the identifier of the copied file.

The procedure from step S21 to step S26 is repetitively executed for all the file identifiers (1 to m) designated in procedure step S21.

When direct copying is completed, the second direct recording server 29 transmits the device status in step S27, and in step s28 the second direct recording client 27 of the digital camera 1 displays OK/error of the direct copy operation on the display unit 8. The contents of the error are, e.g., "empty capacity insufficiency", "write inhibition", "file attributes are different", and "the types of storage are different".

It is, of course, also possible to prevent a failure caused during copying by an error such as empty capacity insufficiency before actual file transfer by repeating procedure S21.

A method of numbering file identifiers will be described below with reference to FIG. 7.

FIG. 7 shows folders 35a to 35n and files 38a to 38c in the form of a tree structure. In each figure indicating a folder or file, the folder name or file name is indicated in the upper stage, and the file identifier is described in the lower stage.

On the basis of this tree structure, the identifier setting means 100 of this direct recording device successively assigns numbers, as file identifiers, to the folders and files without distinguishing between them. By this rule, therefore, the file identifiers of the folders 35a and 35b are "00000001" and "00000002", the file identifiers of the files 38a to 38c are "00000003" to "00000005", and the file identifier of the folder 35*c* is "00000006". . . . Note that no file identifier is set for a temporary folder 36.

Variations of a file storage operation during direct copying will be explained below on the basis of the capability information described above.

Figure 8:
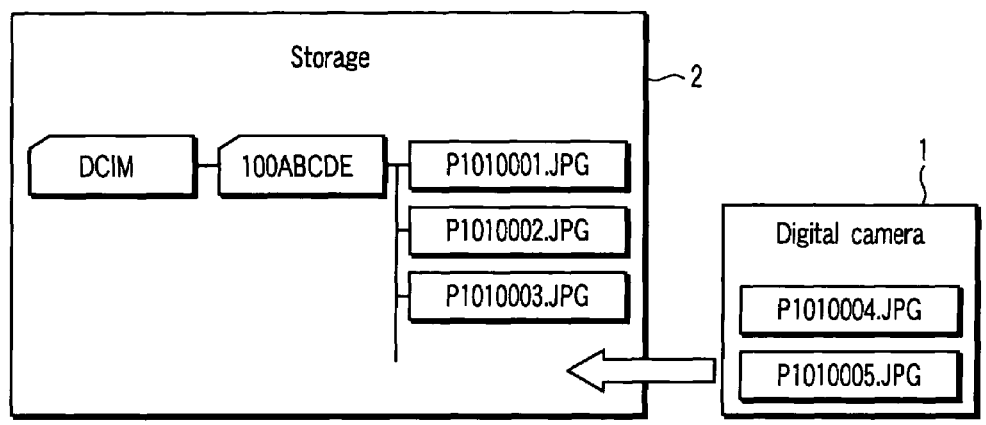
FIG. 8 is a view for explaining a storage operation when a storage has no folder forming function.

FIG. 8 is a view for explaining a storage operation when the storage has no folder forming function.

The first direct recording client 28 of the storage 2 copies transmitted files "P1010004.JPG" and "P1010005.JPG" in an existing folder "100ABCDE". A folder to which files are copied depends upon the specifications installed in the storage 2.

For example, when different folders are used for different types of photographed data such as images, sounds, and motion images, the management of each type after copying can be facilitated. Also, data management after photographing can be facilitated by using different folders for different photographing modes such as a single shooting mode and sequential shooting mode. In addition, it is also possible in procedure step S20 to allow a user to designate a folder for each preset purpose, e.g., a family photograph, travel, and wedding ceremony, and to copy data in the designated folder.

After the transmitted files are copied in the folder, new file identifiers are set for these files. However, the already set file identifiers are not changed, i.e., not rewritten.

Figure 9:
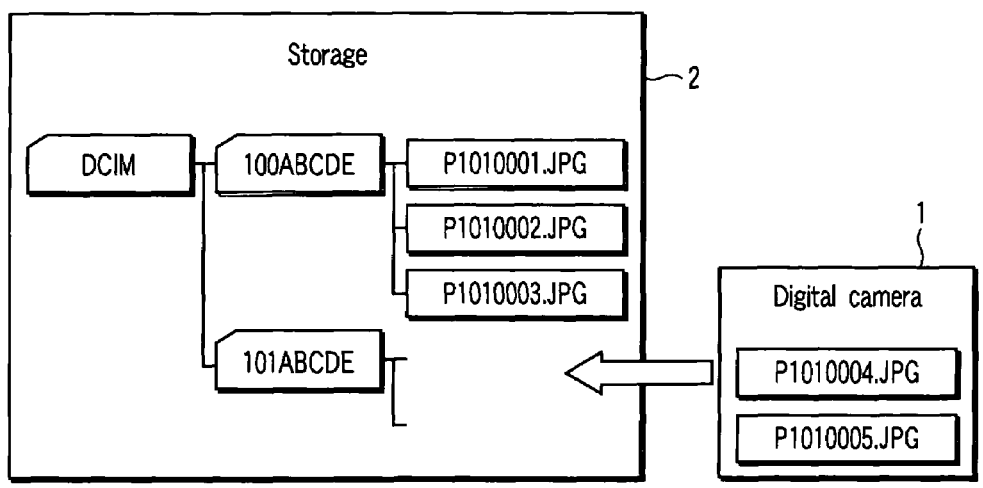
FIG. 9 is a view for explaining a storage operation when the storage has a folder forming function.

FIG. 9 is a view for explaining a storage operation when the storage has a folder forming function.

The first direct recording client 28 of the storage 2 forms a new folder "101ABCDE", and copies transmitted files "P1010004.JPG" and "P1010005.JPG" in this folder.

After the transmitted files are copied in the folder, new file identifiers are set for these files. However, the already set file identifiers are not changed, i.e., not rewritten.

If the storage 2 has no date function, the formation date/time of a newly formed folder cannot be obtained. For example, the digital camera 1 sends the date/time of the start of copy execution to the storage 2 when requesting copying. The storage 2 sets the transmitted date/time as the folder formation date/time.

The storage 2 may also inquire of the digital camera 1 the date/time when forming a folder. The date/time may also be any of the copy execution time, the selection start time, the date/time of one of files to be copied, and the date/time of one file/folder in the digital camera 1.

In this manner, even when the storage 2 has no date function, formation date/time having meaning from the viewpoint of management can be set in a folder to be formed.

FIG. 10 is a view for explaining a storage operation when the storage has no automatic file name generating function.

The first direct recording client 28 of the storage 2 directly copies transmitted files "P1010004.JPG" and "P1010005.JPG" in a folder "100ABCDE" without changing their names. An error occurring when the same file name exists in the folder depends upon processing installed in the storage 2.

After the transmitted files are copied in the folder, new file identifiers are set for these files. However, the already set file identifiers are not changed, i.e., not rewritten.

FIG. 11 is a view for explaining a storage operation when the storage has an automatic file name generating function.

The first direct recording client 28 of the storage 2 copies transmitted files "P1010001.JPG" and "P1010002.JPG" in a folder "100ABCDE" by changing their names to "P1010004.JPG" and "1010005.JPG" so that the same folder does not contain the same name.

After the transmitted files are copied in the folder, new file identifiers are set for these files. However, the already set file identifiers are not changed, i.e., not rewritten.

The direct recording device further has a function of automatically setting file protection during direct copying. File protection is a function which protects the file from being rewritten.

Note that optional operations during the file storage described above can be appropriately combined and executed, and the second direct recording client 27 can designate the operation.

It is also possible to limit the number of files to be copied in one folder, and, if a predetermined number of files is exceeded, to form another folder and copy files in this newly formed folder.

A folder can be formed when the predetermined number is exceeded during copying, when the predetermined number is exceeded before the start of copying, or when the predetermined number will be exceeded although it is not exceeded before the start of copying. This makes it possible to prevent an increase in number of files in one folder, and keep the management easy.

With this direct copy function, data can be directly transferred from the digital camera 1 to the storage and recorded in it without using any PC.

Also, since the storage operation of the storage can be designated, image data can be recorded in a desired state in the storage.

Furthermore, since data is managed by using the file identifiers, the data can be handled regardless of the manufacturers and types of digital cameras and storages.

[Direct Display Function]

This function transmits image data from the storage 2 to the digital camera 1, and displays the data on the display unit 8 or records the data on the apparatus recording medium 6.

Figure 12:
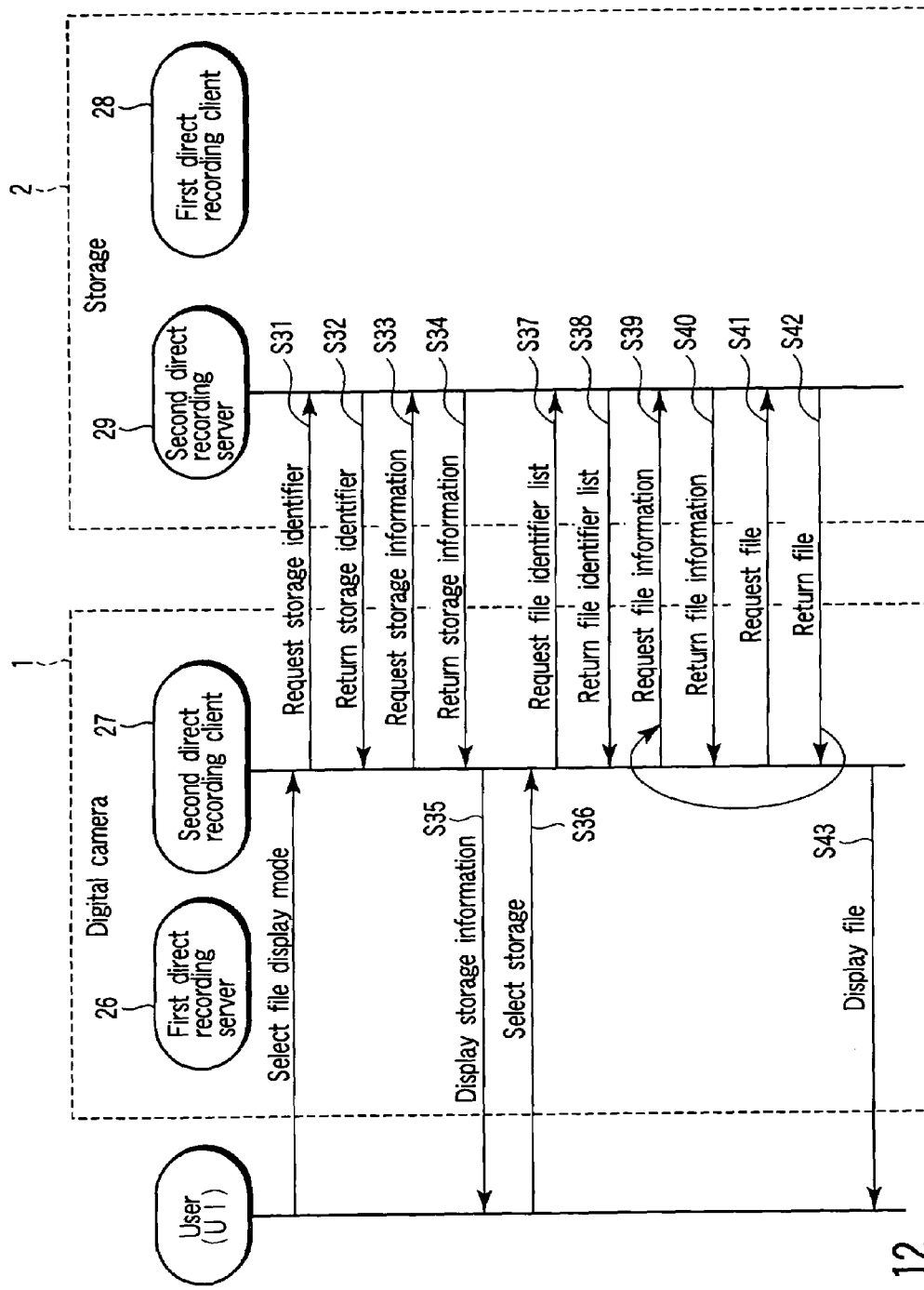
FIG. 12 is a view showing the signal exchange flow of a direct display operation.

FIG. 12 is a view showing the signal exchange flow of the direct display operation.

This direct display operation is executed by signal exchange between the second direct recording server 29 and second direct recording client 27. Therefore, the first direct recording server 26 and first direct recording client 28 do not exchange any signal.

When the user selects a file display mode and inputs the start of direct display by using the operation unit 7 of the digital camera 1, in step S31, the second direct recording client 27 is activated to request the storage 2 to transmit storage identifiers.

The storage identifier is ID data for identifying the logical storage or physical storage of the storage 2, and the identifier setting means 100 of the direct recording device sets unique values for all storages in the storage 2. Accordingly, a storage of interest can be specified by this storage identifier.

FIG. 13 is a view showing the way the storage identifiers are attached.

The storage identifier is made from eight digits, the four upper digits represent a physical storage number, and the four lower digits represent a logical storage number. The physical storage is a storage which physically exists as another device, and the logical storage is a storage in which the same device is virtually divided into a plurality of storages.

In the example shown in FIG. 13, the physical storage number of an MO is "0001", the physical storage number of a CD-R is "0002", the two logical storage numbers of the MO are "0001" and "0002", and storage identifiers are set from these physical storage numbers and logical storage numbers.

In step S32, in the storage 2, the second direct recording server 29 transmits the storage identifiers to the digital camera 1. In step S33, in the digital camera 1 which has received the storage identifiers, the second direct recording client 27 requests storage information of each individual storage identifier.

In step S34, in the storage 2, the second direct recording server 29 edits the storage information, and transmits the edited storage information to the digital camera 1.

The storage information edited by the second direct recording server 29 contains, e.g., the storage type, the file system type such as a format, the access type such as ROM or R/W, the total storage capacity, the empty storage capacity, the storage descriptor, and the volume label.

In step S35, the second direct recording client 27 which has received the storage information displays the storage information on the display unit 8. In step S36, the user refers to this display and selects a storage to be displayed by using the operation unit 7.

The storage information display from step S31 to step S36 may also be used when, e.g., the digital camera 1 and storage 2 are connected.

For example, when the storage 2 having the storage identifiers shown in FIG. 13 is connected to the digital camera 1, the display unit 8 of the digital camera 1 displays three pieces of storage information corresponding to the storage identifiers.

As a consequence, the user can be notified of not only the connection of the storage but also the types of logical or physical storages, and can easily select a desired storage on the basis of the storage information displayed on the display unit 8 of the digital camera 1.

In step S37, the second direct recording client 27 requests a list of file identifiers stored in the storage of the selected storage identifier. In step S38, the second direct recording server 29 forms a list of the corresponding file identifiers, and transmits the answer to the digital camera 1.

In step S39, in the digital camera 1, the second direct recording client 27 extracts one file identifier from the transmitted list, and requests the storage 2 to transmit file information of the file identifier.

In step S40, in the storage 2, the second direct recording server 29 edits the file information of the file identifier and transmits the edited file information to the digital camera 1. This file information as an answer contains, e.g., the file name, file size, file attribute, file formation date, and file update date.

In the digital camera 1, the second direct recording client 27 makes preparations for receiving an image file on the basis of the transmitted file information. The second direct recording client 27 also checks the empty capacity from the file size to determine whether the image file can be received. If the image file can be received, in step S41, the second direct recording client 27 requests file transfer.

In step S42, in the storage 2, the second direct recording server 29 transmits the file of the file identifier to the digital camera 1.

FIG. 14 is a view for explaining the file extracting operation. When "00000003" is designated as a file identifier from the digital camera 1, a file name "P1010001.JPG" is specified and transmitted.

In step 43, in the digital camera 1, the second direct recording client 27 displays the transmitted file on the display unit 8. The transmitted file may also be stored in a predetermined area. Note that when the file is to be stored, the second direct recording client 27 sets a unique file identification number to the file.

The sequence from step S39 to step S43 is repetitively executed for all the file identifiers.

With this direct display function, digital camera 1 data can be directly transferred from the storage 2 without using any PC, and displayed or recorded.

Also, since a desired file in the storage can be acquired, the utilization range of data can be extended.

Furthermore, since data is managed by using the file identifiers, data can be handled regardless of the manufacturers and types of digital cameras and storages.

[File/Storage Manipulating Function]

This function manipulates files and the like in the storage 2 from the digital camera 1.

Figure 15:
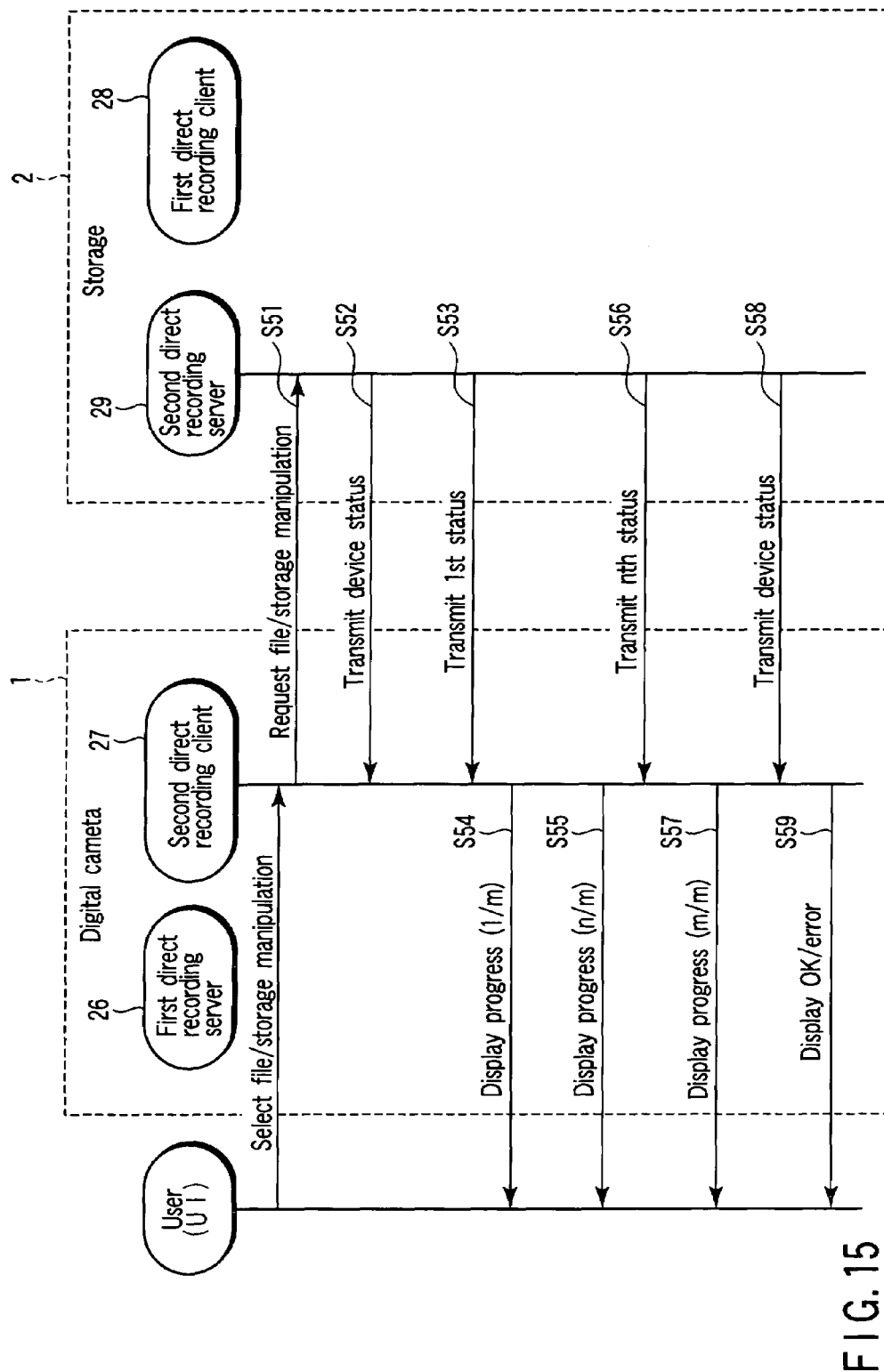
FIG. 15 is a view showing the signal exchange flow of a file/storage manipulating operation.

FIG. 15 is a view showing the signal exchange flow of a file/storage manipulating operation.

When the user selects contents to be manipulated and inputs the start of the manipulation by using the operation unit 7, in step S51, the second direct recording client 27 is activated to transmit a file/storage manipulation request to the storage 2.

In this data of the file/storage manipulation request, file identifiers (1 to m) to be manipulated and the manipulating operation of the storage are designated. Examples of the storage manipulating operation are the operation of copy/move of image data in the storage, the operation of copy/move of image data to another storage, an operation such as delete of image data in the storage, and an operation of formatting the storage.

In the storage 2, the second direct recording server 29 starts the operation based on the manipulation request, and, in step S52, transmits a device status, as a response indicating that the operation is started. The device status is information indicating the state on the storage side, such as an idling state or operating state.

In steps S53 and S56, the second direct recording server 29 of the storage 2 transmits a status whenever the manipulating operation is started for each file identifier. In steps S54, S55, and S57, the second direct recording client 27 which has received this status updates and displays progress information on the display unit 8 at that timing.

In step S58, the second direct recording server 29 transmits the device status at the timing at which the manipulating operation is completed. In step S59, the second direct recording client 27 of the digital camera 1 displays OK/error of the file/storage manipulating operation on the display unit 8.

Practical operations of this file/storage manipulation will be explained below.

Figure 16:
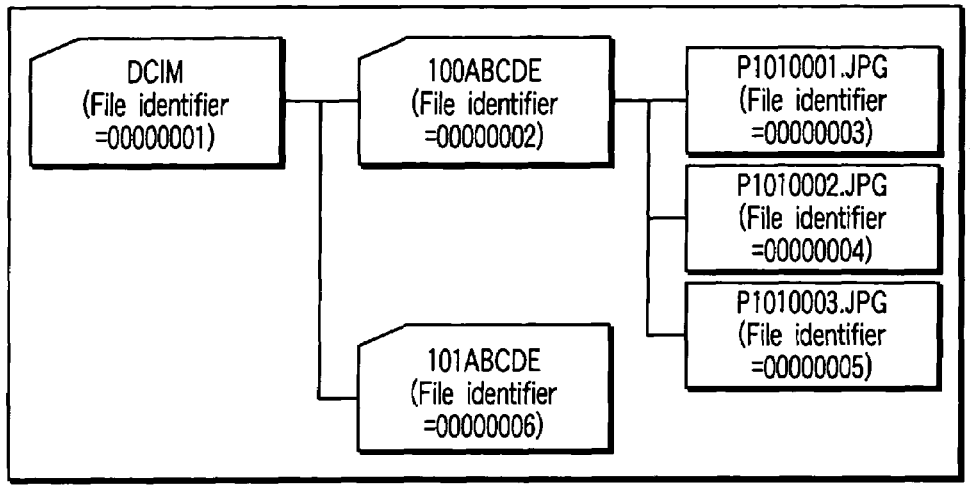
FIG. 16 is a view for explaining the operation of copy/move to another folder.

FIG. 16 is a view for explaining the operation of copy/move to another folder.

This is an operation of copying or moving a file in the storage to anther folder. To copy or move a file name "P1010001.JPG" to a folder "1001ABCDE", the second direct recording client 27 of the digital camera 1 designates, in a file/storage manipulation request, a file identifier "00000003" to be copied/moved and a file identifier "00000006" of the folder as the copy/move destination.

Also, when performing a copy operation, the second direct recording server 29 of the storage 2 sets a unique file identifier for the newly copied file. In a move operation, the file identifier is not changed.

Figure 17:
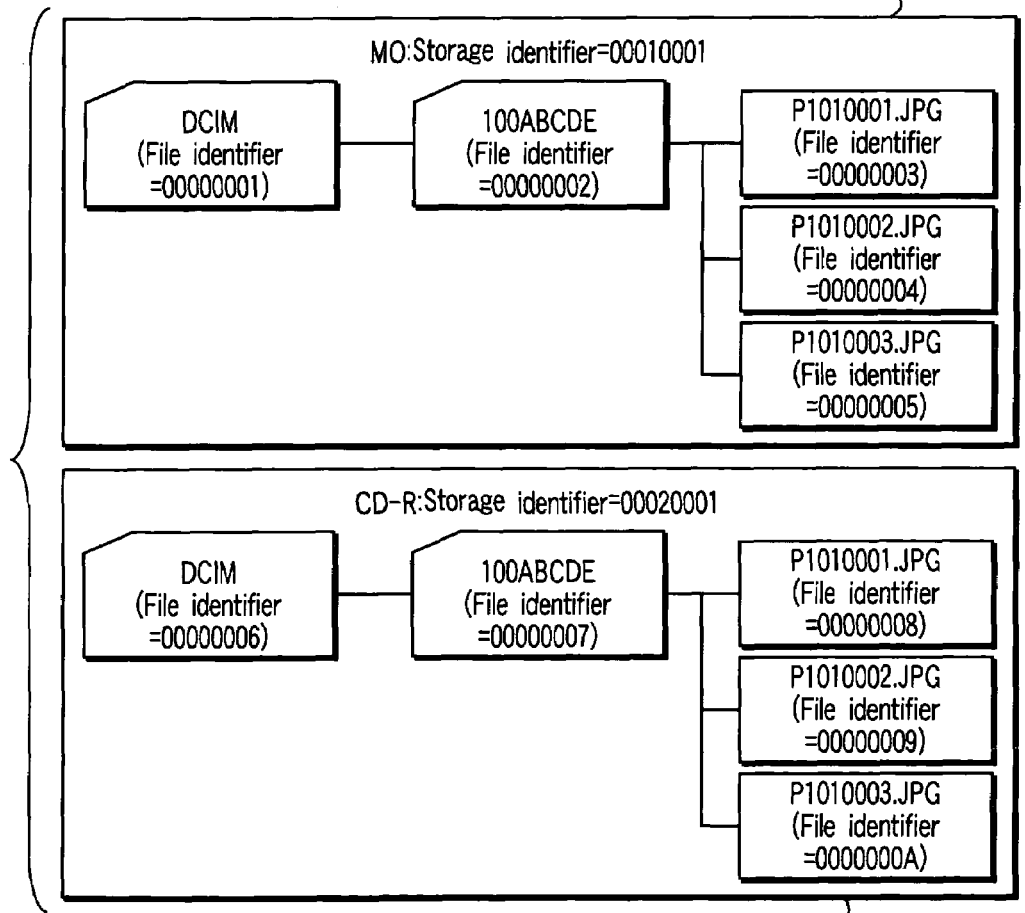
FIG. 17 is a view for explaining the operation of copy/move to another physical/logical storage.

FIG. 17 is a view for explaining the operation of copy/move to another physical/logical storage.

This operation copies or moves a file in the storage to a folder of another physical/logical storage. To copy or move a file name "P1010001.JPG" stored in an MO 45 shown in FIG. 17 to a folder "100ABCDE" stored in a CD-R 46 shown in FIG. 17, the second direct recording client 27 of the digital camera 1 designates, in a file/storage manipulation request, a file identifier "00000003" to be copied/moved and a storage identifier "0020001" and file identifier "00000007" of the copy/move destination.

Also, when performing a copy operation, the second direct recording server 29 of the storage 2 sets a unique file identifier for the newly copied file. In a move operation, the file identifier is not changed.

Figure 18:
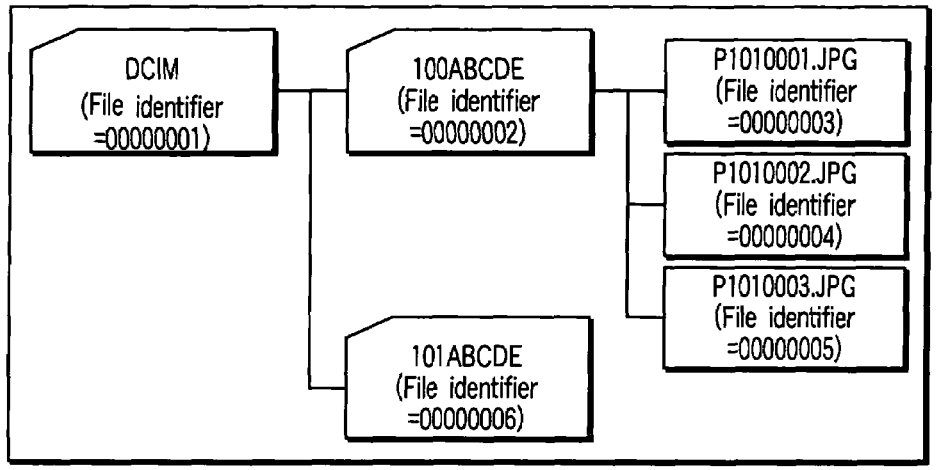
FIG. 18 is a view for explaining a delete/ protection operation.

FIG. 18 is a view for explaining a delete/protection operation.

This operation deletes or protects a file or folder in the storage. To delete or protect a file name "P1010001.JPG", the second direct recording client 27 of the digital camera 1 designates a file identifier "00000003" to be deleted/protected in a file/storage manipulation request.

Figure 19:
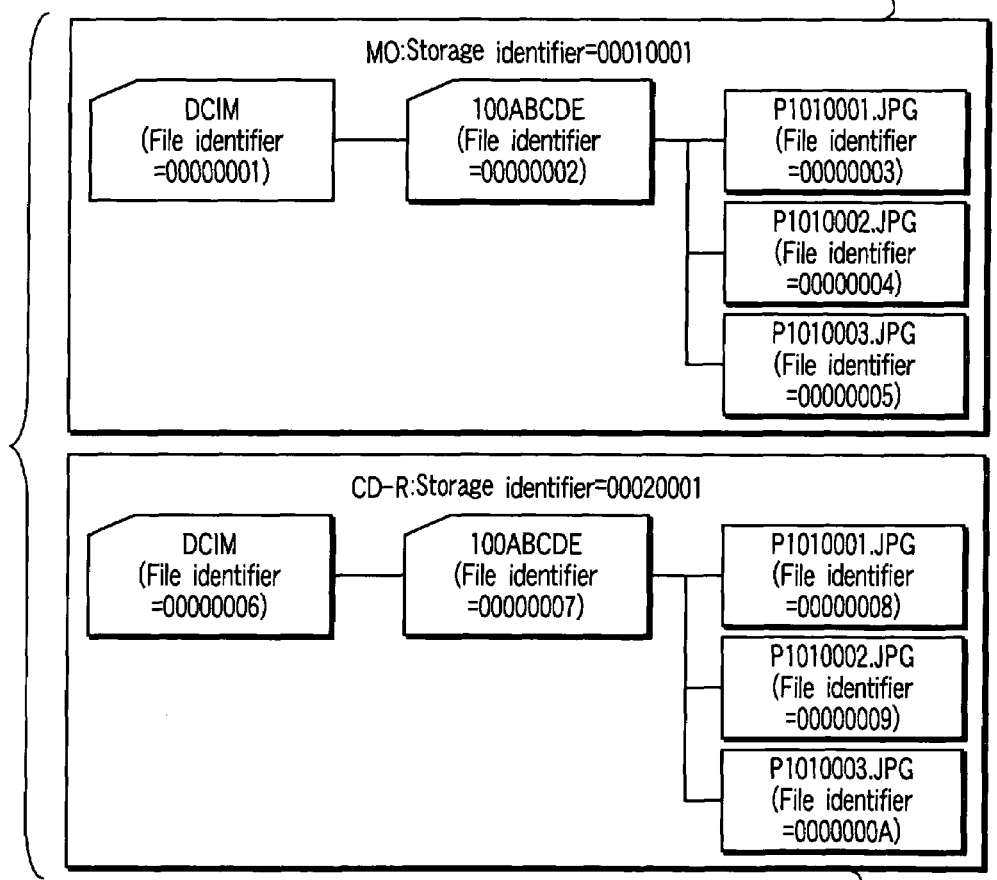
FIG. 19 is a view for explaining a format/eject operation.

FIG. 19 is a view for explaining a format/eject operation.

This operation formats a recording medium in the storage, or ejects the recording medium from the storage. To format/eject an MO 45 shown in FIG. 19, the second direct recording client 27 of the digital camera 1 designates a storage identifier "00010001" in a file/storage manipulation request.

Note that if only one logical/physical storage exists, the designation of a storage identifier can be omitted.

With this file/storage manipulating function, files in the storage 2 can be manipulated without using any PC, so files can be stored in desired states in the storage. Therefore, this function is effective in data management.

[Date Recording Function]

In addition to the functions described above, this direct recording device has a date recording function of recording the date of an operation in the corresponding file or folder.

That is, (1) when a new file is generated by copying a file from the digital camera 1 to the storage 2, (2) when a new file is generated by copying a file from the storage 2 to the digital camera 1, (3) when a new file is generated by copying a file in the storage, (4) when a new folder is generated by copying a folder in the storage, or (5) when a new folder is formed during file copying, the date of generation by copying is recorded in relation to the corresponding file or folder.

With this date recording function, the date of manipulation can be managed and used as a log.

[Simultaneous Printing/Copying Function]

In addition to the functions described above, this direct recording device has a simultaneous printing/copying function by which a file can be directly output to a printer and printed and at the same time recorded in the storage.

The user can simultaneously start printing and recoding with one operation by using this function.

Photographed image data is often not only printed but also saved on an external recording medium. However, the printing operation is time-consuming, and the user is put under stress as he or she is waiting until printing is completed. Therefore, the simultaneous printing/copying function can increase the efficiency of manipulation by the user and eliminate the stress of the user at the same time.

Note that on the basis of the direct recording device described above, the direct recording device of the present invention can be configured as follows.

(1) A direct recoding device characterized by being incorporated into a first apparatus and a second apparatus which directly connects by signal to the first apparatus, and including communicating means for mutually transferring at least one first data stored in the first apparatus and at least one second data stored in the second apparatus.

(2) A direct recording device described in (1) characterized by including identifier setting means for setting an identifier which is a unique data identification code, and data specifying means for specifying the first and second data on the basis of the identifier.

Note that the above embodiments include inventions in various stages, so various inventions can be extracted by appropriately combining a plurality of constituent elements disclosed. For example, if the problems described in the paragraph of problems to be solved by the invention can be solved and the effects described in the paragraph of the effects of the invention can be obtained even when some of all the constituent elements disclosed in the embodiments are deleted, this arrangement from which some constituent elements are deleted can be extracted as an invention.

The present invention can be used when data is to be handled by directly connecting apparatuses. Accordingly, the present invention can be extensively used in the industries of optical apparatuses such as digital cameras, and in the industries of information apparatuses such as communication apparatuses and information terminals.

What is claimed is:

1. A direct recording device which is incorporated into each of a first apparatus and a second apparatus that are connectable to each other by a signal, and which allows mutual handling of data held by the first and second apparatuses, wherein the direct recording device comprises:

an identifier setting part configured to set, for data stored in each of internal storage devices of the first and second apparatuses, identifiers for identifying the data; and a transfer part configured to mutually transmit and receive information containing at least one of an identifier and the data stored in each of the internal storage devices of the first and second apparatuses;

wherein the first and second apparatuses are directly connectable without a general information processing device therebetween, and wherein the direct recording device incorporated into the first apparatus further comprises:

a recording request transmitting part configured to transmit an identifier list and a direct copy request, for at least one data which is stored in the internal storage device of the first apparatus, and which is to be stored in the internal storage device of the second apparatus;

a recording data transmitting part configured to, based on the identifier list transmitted by the recording request transmitting part, whenever an identifier listed in the identifier list is transmitted from the second apparatus, transmit data specified by the identifier to the second apparatus; and a progress display part configured to receive, from the second apparatus, information representing whether the data transmitted by the recording data transmitting part is normally stored in the internal storage device of the second apparatus, and display a progress situation on a display device connected to the first apparatus.

2. The direct recording device according to claim 1, wherein the direct recording device incorporated into the first apparatus further comprises:

an identifier list requesting part configured to request the second apparatus to transmit an identifier list of data stored in the internal storage device of the second apparatus;

an identifier transmitting part configured to transmit, to the second apparatus, an identifier listed in the identifier list transmitted from the second apparatus to request data specified by the identifier; and a data display part configured to receive the data transmitted from the second apparatus in response to the transmitted identifier, and display contents of the data on the display device connected to the first apparatus.

3. The direct recording device according to claim 1, wherein the direct recording device incorporated into the first apparatus further comprises:
   an identifier list requesting part configured to request the second apparatus to transmit an identifier list of data stored in the internal storage device of the second apparatus; and
   a data manipulation designating part configured to transmit a request for at least one of moving, copying, and deleting, in the second apparatus, at least one data corresponding to the identifier list transmitted from the second apparatus, and transmit an identifier corresponding to the at least one data to be at least one of moved, copied, and deleted.

4. The direct recording device according to claim 3, wherein the data manipulation designating part transmits, to the second apparatus, the identifier of the at least one data to be manipulated and information which designates a manipulation type.

5. The direct recording device according to claim 1, wherein the direct recording device incorporated into the second apparatus further comprises a second identifier setting part configured to, when one of: (i) data received from the first apparatus is stored in the internal storage device of the second apparatus, and (ii) new data is generated by copying data stored in the internal storage device of the second apparatus, set an identifier for the data.

6. The direct recording device according to claim 1, wherein the first apparatus directly connects by a signal to a third apparatus incorporating the direct recording device, and the direct recording device incorporated into the first apparatus simultaneously transmits information containing at least one of data and an identifier to the second and third apparatuses.

7. A direct recording device which is incorporated into each of a first apparatus and a second apparatus that are connectable to each other by a signal, and which allows mutual handling of data held by the first and second apparatuses, wherein the direct recording device comprises:
   an identifier setting part configured to set, for data stored in each of internal storage devices of the first and second apparatuses, identifiers for identifying the data; and
   a transfer part configured to mutually transmit and receive information containing at least one of an identifier and the data stored in each of the internal storage devices of the first and second apparatuses;
   wherein the first and second apparatuses are directly connectable without a general information processing device therebetween, and
   wherein the direct recording device incorporated into the first apparatus further comprises:
      a capability information inquiring part configured to inquire about capability of a direct recording function of the second apparatus;
      a capability information acquiring part configured to acquire capability information transmitted from the second apparatus in response to the inquiry;
      a recording request transmitting part configured to transmit an identifier list and a direct copy request, for at least one data which is stored in the internal storage device of the first apparatus, and which is to be stored in the internal storage device of the second apparatus;
      a recording data transmitting part configured to, based on the identifier list transmitted by the recording request transmitting part, whenever an identifier listed in the identifier list is transmitted from the second apparatus, transmit data specified by the identifier to the second apparatus; and
      a progress display part configured to receive, from the second apparatus, information representing whether the data transmitted by the recording data transmitting part is normally stored in the internal storage device of the second apparatus, and display a progress situation on a display device connected to the first apparatus.

8. The direct recording device according to claim 7, wherein the direct recording device incorporated into the first apparatus further comprises:
   an identifier list requesting part configured to request the second apparatus to transmit an identifier list of data stored in the internal storage device of the second apparatus;
   an identifier transmitting part configured to transmit, to the second apparatus, an identifier listed in the identifier list transmitted from the second apparatus to request data specified by the identifier; and
   a data display part configured to receive the data transmitted from the second apparatus in response to the transmitted identifier, and display contents of the data on the display device connected to the first apparatus.

9. The direct recording device according to claim 7, wherein the direct recording device incorporated into the first apparatus further comprises:
   an identifier list requesting part configured to request the second apparatus to transmit an identifier list of data stored in the internal storage device of the second apparatus; and
   a data manipulation designating part configured to transmit a request for at least one of moving, copying, and deleting, in the second apparatus, at least one data corresponding to the identifier list transmitted from the second apparatus, and transmit an identifier corresponding to the at least one data to be at least one of moved, copied, and deleted.

10. The direct recording device according to claim 9, wherein the data manipulation designating part transmits, to the second apparatus, the identifier of the at least one data to be manipulated and information which designates a manipulation type.

11. The direct recording device according to claim 7, wherein the direct recording device incorporated into the second apparatus further comprises a second identifier setting part configured to, when one of: (i) data received from the first apparatus is stored in the internal storage device of the second apparatus, and (ii) new data is generated by copying data stored in the internal storage device of the second apparatus, set an identifier for the data.

12. The direct recording device according to claim 7, wherein the first apparatus directly connects by a signal to a third apparatus incorporating the direct recording device, and the direct recording device incorporated into the first apparatus simultaneously transmits information containing at least one of data and an identifier to the second and third apparatuses.

13. A direct recording method for a direct recording device which is incorporated into each of a first apparatus and a second apparatus that are connectable to each other by a signal, and which allows mutual handling of data held by the first and second apparatuses, wherein the direct recording method comprises:
   setting, for data stored in each of internal storage devices of the first and second apparatuses, identifiers for identifying the data;

mutually transmitting and receiving information containing at least one of an identifier and the data stored in the internal storage devices of the first and second apparatuses, wherein the first and second apparatuses are directly connectable without a general information processing device therebetween;

transmitting an identifier list and a direct copy request, for at least one data which is stored in the internal storage device of the first apparatus, and which is to be stored in the internal storage device of the second apparatus;

transmitting data specified by an identifier to the second apparatus, whenever the identifier listed in the transmitted identifier list is transmitted from the second apparatus; and receiving, from the second apparatus, information representing whether the transmitted data specified by the identifier is normally stored in the internal storage device of the second apparatus, and displaying a progress situation on a display device connected to the first apparatus.

14. The direct recording method according to claim 13, further comprising:

requesting the second apparatus to transmit an identifier list of data stored in the internal storage device of the second apparatus;

transmitting, to the second apparatus, an identifier listed in the identifier list transmitted from the second apparatus to request data specified by the identifier; and receiving the data transmitted from the second apparatus in response to the transmitted identifier, and displaying contents of the data on the display device connected to the first apparatus.

15. The direct recording method according to claim 13, further comprising:

requesting the second apparatus to transmit an identifier list of data stored in the internal storage device of the second apparatus; and transmitting a request for at least one of moving, copying, and deleting, in the second apparatus, at least one data corresponding to the identifier list transmitted from the second apparatus, and transmitting an identifier corresponding to the at least one data to be at least one of moved, copied, and deleted.

16. The direct recording method according to claim 15, wherein transmitting the request and the identifier includes transmitting, to the second apparatus, the identifier of the at least one data to be manipulated and information which designates a manipulation type.

17. The direct recording method according to claim 13, further comprising, when one of: (i) data received from the first apparatus is stored in the internal storage device of the second apparatus, and (ii) new data is generated by copying data stored in the internal storage device of the second apparatus, setting an identifier for the data.

18. The direct recording method according to claim 13, wherein the first apparatus directly connects by a signal to a third apparatus incorporating the direct recording device, and the direct recording method further comprises simultaneously transmitting information containing at least one of data and an identifier to the second and third apparatuses.

19. A direct recording method for a direct recording device which is incorporated into each of a first apparatus and a second apparatus that are connectable to each other by a signal, and which allows mutual handling of data held by the first and second apparatuses, wherein the direct recording method comprises:

setting, for data stored in each of internal storage devices of the first and second apparatuses, identifiers for identifying the data;

mutually transmitting and receiving information containing at least one of an identifier and the data stored in the internal storage devices of the first and second apparatuses, wherein the first and second apparatuses are directly connectable without a general information processing device therebetween;

inquiring about capability of a direct recording function of the second apparatus;

acquiring capability information transmitted from the second apparatus in response to the inquiry;

transmitting an identifier list and a direct copy request, for at least one data which is stored in the internal storage device of the first apparatus, and which is to be stored in the internal storage device of the second apparatus;

transmitting data specified by an identifier to the second apparatus, whenever the identifier listed in the transmitted identifier list is transmitted from the second apparatus; and receiving, from the second apparatus, information representing whether the transmitted data specified by the identifier is normally stored in the internal storage device of the second apparatus, and displaying a progress situation on a display device connected to the first apparatus.

20. The direct recording method according to claim 19, further comprising:

requesting the second apparatus to transmit an identifier list of data stored in the internal storage device of the second apparatus;

transmitting, to the second apparatus, an identifier listed in the identifier list transmitted from the second apparatus to request data specified by the identifier; and receiving the data transmitted from the second apparatus in response to the transmitted identifier, and displaying contents of the data on the display device connected to the first apparatus.

21. The direct recording method according to claim 19, further comprising:

requesting the second apparatus to transmit an identifier list of data stored in the internal storage device of the second apparatus; and transmitting a request for at least one of moving, copying, and deleting, in the second apparatus, at least one data corresponding to the identifier list transmitted from the second apparatus, and transmitting an identifier corresponding to the at least one data to be at least one of moved, copied, and deleted.

22. The direct recording method according to claim 21, wherein transmitting the request and the identifier includes transmitting, to the second apparatus, the identifier of the at least one data to be manipulated and information which designates a manipulation type.

23. The direct recording method according to claim 19, further comprising, when one of: (i) data received from the first apparatus is stored in the internal storage device of the second apparatus, and (ii) new data is generated by copying data stored in the internal storage device of the second apparatus, setting an identifier for the data.

24. The direct recording method according to claim 19, wherein the first apparatus directly connects by a signal to a third apparatus incorporating the direct recording device, and the direct recording method further comprises simultaneously transmitting information containing at least one of data and an identifier to the second and third apparatuses.

* * * * *